No. 769,143.

Patented September 6, 1904.

UNITED STATES PATENT OFFICE.

EMIL BOELLINGHAUS, OF HAMBURG-BORGFELDE, GERMANY.

FILTER.

SPECIFICATION forming part of Letters Patent No. 769,143, dated September 6, 1904.

Application filed December 17, 1903. Serial No. 185,487. (No model.)

*To all whom it may concern:*

Be it known that I, EMIL BOELLINGHAUS, a citizen of Germany, residing at Hamburg-Borgfelde, Germany, have invented new and useful Improvements in Filters, of which the following is a specification.

This invention relates to a filter in which a number of separate filtering-chambers communicate with a common liquid-supply pipe, filtrate-discharge pipe, and rinsing-pipe. In this way an effective filter for a large quantity of liquid and occupying a relatively small room is obtained.

Figure 1:
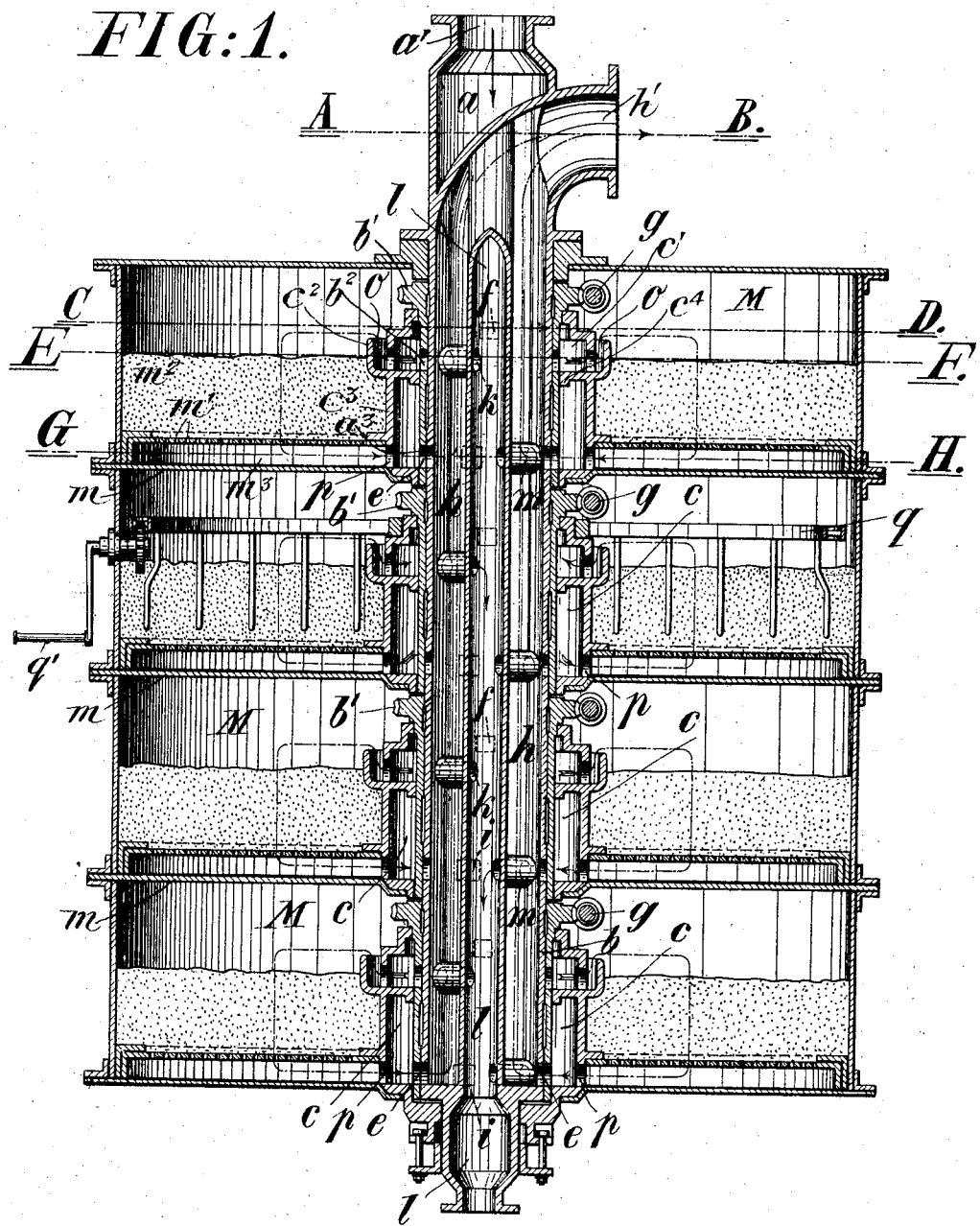
Figure 2:
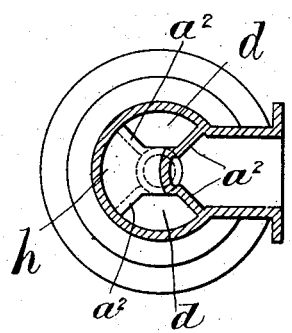
Figure 3:
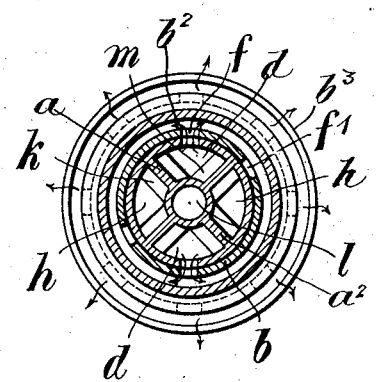
Figure 4:
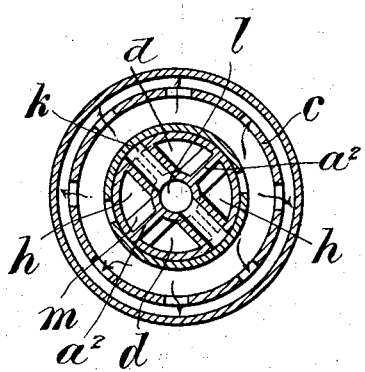
Figure 5:
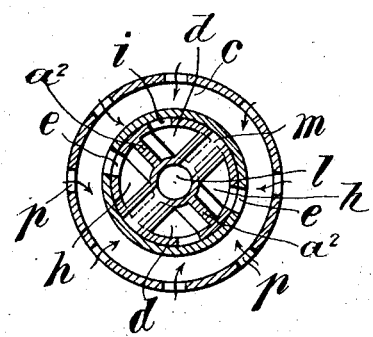

In the accompanying drawings, Figure 1 is a vertical section through my improved filter; Fig. 2, a cross-section through the center of the filter on line A B, Fig. 1; Fig. 3, a partial cross-section through the filter on line C D, Fig. 1; Fig. 4, a similar cross-section on line E F, Fig. 1; and Fig. 5, a similar cross-section on line G H, Fig. 1.

The letter $a$ represents a vertical inlet-pipe, into the top $a'$ of which the liquid to be filtered enters. The lower section of pipe $a$ contains a concentric waste-pipe $l$, which is open at the bottom and closed at the top. Between the inner pipe $l$ and the outer pipe $a$ there are arranged four upright partitions $a^2$, which divide the space between the two pipes into four ducts or compartments $d$ $d$ $h$ $h$, which are closed at the bottom. The upper ends of diametrically opposite inlet-ducts $d$ $d$ communicate with the liquid-inlet $a'$, while the upper ends of the two other diametrically opposite outlet-ducts $h$ communicate with a filtrate-discharge pipe $h'$.

The pipe $a$ is surrounded by a series of superposed filtering-chambers M, the drawings showing four such chambers; but any suitable number may be employed. Between each filtering-chamber M and pipe $a$ there is arranged a rotatable sleeve $b$, which may receive intermittent motion for the purposes hereinafter described by a worm $g$ and a worm-wheel $b'$, forming part of the sleeve.

At the center of each filtering-chamber there is formed between sleeve $b$ and a concentric cylinder $c^3$ a lower annular compartment $c$ and an upper annular compartment $c'$, divided by partitions $c^4$. The filtering-chambers M are separated from each other by plates or partitions $m$. Slightly above plate $m$ each filtering-chamber is provided with a perforated bottom $m'$, supporting the filtering material $m^2$, so that an annular chamber $m^3$ is formed which communicates with compartment $c$ through ports $p$.

Pipe $a$ as well as sleeves $b$ are provided with a number of perforations or ports, which are so arranged that three different operations may be performed within the filter after sleeves $b$ have been intermittently rotated. In the initial position the liquid is filtered, in the second position the filtering material is washed, while in the third position the filtering material is again rendered fit for filtration.

As the ports are arranged in the same manner for all filtering-chambers, the description of the ports for but one chamber will suffice.

For filtering the liquid I provide each compartment $d$ with an upper port $f$, that registers in the initial position of sleeve $b$ with an aperture $b^2$ of said sleeve, which opens into the upper compartment $c'$. The lower compartment $c$ communicates by ports $e$ of sleeve $b$, that register with lower apertures $a^3$ of pipe $a$, with the compartments $h$. In this position the liquid to be filtered will flow as follows: It enters compartments $d$ through inlet $a'$, passes through ports $f$ $b^2$ into upper compartment $c'$. Thence the liquid is evenly distributed upon the filtering material $m^2$ by overflowing the rim $c^2$ of compartment $c'$. After percolating through the filtering material the filtrate enters through perforated bottom $m'$ the chamber $m^3$ and is discharged through compartment $c$, ports $e$ $a^3$, and compartments $h$ into the filtrate-outlet $h'$.

For washing the filtering material a second series of ports is formed in pipe $a$ and sleeve $b$, which ports will register with each other after the sleeve $b$ has been rotated through sixty degrees. In this position of sleeve $b$ the ports $b^2$ and $e$ are closed, while ports $i$ of compartments $h$ will register with the ports $e$ of sleeve $b$. At the same time ports $b^2$ will register with channels $m$, leading from pipe $a$ into pipe $l$. In this position the operation is as follows:

Part of the filtrate previously obtained is used for washing the filtering material, for which purpose it is forced by any suitable means (not shown) from compartments $h$, through ports $i\ e$, compartment $c$, into chambers $m^3$. Thence it will pass through the filtering material in a direction opposite to that of the liquid previously filtered and is discharged through ports $b^2\ k$ into waste-pipe $l$. During the washing operation the filtering material may be stirred by a rake $q$, operated by crank-handle $q'$ and illustrated in the second compartment of Fig. 1. After the filtering material has been thus sufficiently washed the liquid from compartment $d$ may be introduced into the filter, so as to compact the filtering material again and render it suitable for the filtering operation. For this purpose the sleeve $b$ is again rotated through sixty degrees, in which position the ports $i\ k$ are closed, while the ports $f$ of compartments $d$ will register with the ports $b^3$ of sleeve $b$, and ports $e$ will register with channels $m$, leading from pipe $a$ to pipe $l$. The liquid will thus flow from compartments $d$, through ports $f\ b^3$, cylinder $c'$ into filter-chamber M. Thence it will pass through the filtering material $m^2$, perforated bottom $m'$, chamber $m^3$, compartment $c$, ports $e\ m$ into discharge-pipe $l$. After the filtering material has sufficiently settled sleeve $b$ is again turned through sixty degrees, and the ports $f\ b^2\ e\ a^3$ will reassume a position ready for the filtering operation.

What I claim is—

1. In a filter, the combination of a pipe having inlet and outlet ducts, with a surrounding rotatable sleeve provided with several ports, a cylinder surrounding the sleeve and having a partition to form an upper and a lower compartment, a filtering-chamber surrounding the cylinder, filtering material within the chamber, ports for connecting the inlet and outlet ducts with the upper and lower compartments, and means to rotate the sleeve to change the direction of flow, substantially as specified.

2. In a filter, the combination of a pipe having inlet and outlet ducts, with a surrounding rotatable sleeve provided with several ports, a cylinder surrounding the sleeve and having a partition to form an upper and a lower compartment, a filtering-chamber surrounding the cylinder, filtering material within the chamber, ports for connecting the inlet and outlet ducts with the upper and lower compartments, a waste-pipe, ports for connecting the waste-pipe with the upper and lower compartments, and means to rotate the sleeve to change the direction of flow, substantially as specified.

Signed by me at Stuttgart this 19th day of November, 1903.

EMIL BOELLINGHAUS.

Witnesses:
ERNST ENTERMOD,
T. LADMIRANCE.